United States Patent

Tulley

[15] 3,644,271

[45] Feb. 22, 1972

[54] COMPOSITION AND PROCESS FOR INJECTION MOLDING THERMOPLASTIC MATERIAL AND GLASS FIBERS

[72] Inventor: Frederick T. Tulley, Baton Rouge, La.
[73] Assignee: Ethyl Corporation, New York, N.Y.
[22] Filed: Mar. 2, 1970
[21] Appl. No.: 15,921

[52] U.S. Cl..............................260/41, 260/37 R, 260/37 N, 260/37 PC, 260/40 R, 260/41.5 A, 264/328
[51] Int. Cl.......................................C08f 45/10, B28b 1/24
[58] Field of Search................................260/41 AG, 899, 41

[56] References Cited

UNITED STATES PATENTS 3,396,142   8/1968   Little et al. ..............................260/41

FOREIGN PATENTS OR APPLICATIONS 650,651    10/1962   Canada...............................260/899
1,010,043  11/1965   Great Britain.........................260/41

*Primary Examiner*—Allan Lieberman
*Assistant Examiner*—J. H. Derrington
*Attorney*—Donald L. Johnson

[57] ABSTRACT

A composition and process for the manufacture of shaped articles by injection molding of thermoplastic material and glass fibers. The process involves the heating and masticating of from about 20 to about 40 percent weight thermoplastic material in the form of a powder having a particle size from about 30 to about 200 mesh, with from about 40 percent to about 60 percent weight of the same thermoplastic material in the form of pellets having a maximum dimension of about 1/16 inch to about 3/8 inch, together with from about 20 to about 40 percent weight of glass fibers having a maximum length of about 1/16 inch. The mixture is then injection molded to produce the article.

6 Claims, No Drawings

COMPOSITION AND PROCESS FOR INJECTION MOLDING THERMOPLASTIC MATERIAL AND GLASS FIBERS

BACKGROUND OF THE INVENTION

1. Field of the Invention

This invention relates to a process for the manufacture of shaped articles by injection molding a mixture of a thermoplastic material and glass fibers and to the composition of the mixture.

2. Description of the Prior Art

The use of thermoplastic molding compositions incorporating glass fiber reinforcing material has gained wide acceptance. The difficulties of obtaining a good bond between the thermoplastic material and the glass fibers has been substantially overcome by the development of suitable treating agents for the glass fibers. Formerly glass-reinforced thermoplastic materials were used primarily for compression molding. However, recently many thermoplastic materials reinforced with glass fibers are being offered in the form of pellets for injection molding. Considerable technology has been developed for producing the glass-reinforced molding compositions. However there is considerable demand for large injection-molded objects which make it economically attractive to use powdered thermoplastic powder blends, together with chopped glass fibers as feed stock for injection-molding machines. Canadian Pat. No. 750,283 discloses a method for the continuous mixing of chopped glass fibers with particulate thermoplastic resin as they are fed to an injection-molding machine. However, when using this technology or when premixing the thermoplastic resin in powder form with chopped glass fibers, difficulty has been encountered in maintaining a continuous flow of the mixed resin and glass through the feed port of the injection-molding machine. The glass fibers tend to bundle together and bridge in the throat of the feed port. This results in the powdered resin sifting through the bundles of the glass fibers resulting in the plastic article produced by the injection-molding machine not having the glass fibers uniformly distributed in the article. It also often causes the mold to be incompletely filled, resulting in a defective article or at least poor surface finish on the article. Efforts to solve this problem by "starve feeding" of the injection-molding machine have only been partially successful (see U.S. Pat. No. 3,164,563).

SUMMARY OF THE INVENTION

It is an object of the present invention to provide a process for the manufacture of shaped articles by injection molding thermoplastic material and glass fibers.

It is also an object of the present invention to provide a process for injection molding glass fiber-reinforced thermoplastic articles which provides uniform distribution of the glass fibers within the articles.

It is a further object of the present invention to provide a process for injection molding glass fiber-reinforced thermoplastic articles, which process provides substantial economies in the manufacture of the article.

It is still another object of the present invention to provide a composition for injection molding glass fiber-reinforced thermoplastic articles.

The foregoing objects and other advantages of the invention may be realized in a process for manufacturing a shaped article by injection molding thermoplastic material and glass fibers. The process is carried out by heating and masticating together from about 20 to about 40 percent weight of a thermoplastic material in the form of a powder having a particle size from about 30 to about 200 mesh, together with about 60 percent to about 40 percent weight of a thermoplastic material in the form of pellets having a maximum dimension from about 1/16 inch to about ⅜ inch, together with about 20 percent weight glass fibers having a maximum length of about 1/16 inch, until a uniform, flowable mass is produced. The mass is then injection molded to produce the article.

By utilizing the foregoing process, it has been found possible to produce injection molded glass-reinforced thermoplastic articles having uniform distribution of glass fibers within the article. Additionally, the articles are found to have excellent surface characteristics. Heretofore when premixed powdered thermoplastic material and chopped glass fibers have been fed to injection-molding machines, difficulty has been encountered in bridging of the feed throat on the injection molder. Additionally, problems have been encountered because of the sifting of the powdered thermoplastic material as the feed moves in the throat of the injection-molding machine. This causes nonuniform feed to the machine and produces a nonhomogenous shot of plastic for the injection molder. Often cavities or surface defects are the result of nonuniform distribution of the glass fibers within the plastic mass. Additionally, nonuniform distribution results in the article having low impact and tensile strengths.

Surprisingly, it has been discovered that when one mixes chopped glass fibers, a thermoplastic material in powder form, and a thermoplastic material in pellet form together, and then injection molds an article from the mixture, the article has excellent distribution of glass fibers throughout. A uniform blend of these three components may be made by use of a ribbon blender or other conventional dry solids mixer. The mixture can be fed using a continuous feeding device into an injection-molding machine to produce injection-molded articles having excellent surface characteristics and uniform distribution of glass fibers within the article. However, if desired, the powder, pellets and glass fibers may be fed individually in the proper proportions into the feed port of the masticating apparatus.

DESCRIPTION OF THE PREFERRED EMBODIMENTS

The thermoplastic material utilized in both the composition and the process of the present invention is provided in two different forms. A portion of the material is in the form of discrete particles or powder. Numerous commercially available thermoplastic materials are available in suitable powder form. The other portion of the same thermoplastic material is provided in the form of pellets which are also commercially available in many thermoplastic resin compositions. The thermoplastic material employed in the present invention may be any moldable, extrudable plastic material. Examples of suitable polymeric materials are the polyamides such as caprolactam (Nylon 6), polyhexamethylene adipamide (Nylon 66) and copolymers thereof. Other suitable thermoplastic materials are the polyolefins and copolymers of polyolefins such as polyethylene (both low, medium and high density), polypropylene, polybutene-1, poly-4-methyl pentene-1, and copolymers of these and other olefinic comonomers (such as vinyl chloride, methyl methacrylate, vinyl acetate, and acrylic acid). Other suitable thermoplastics are polystyrene and copolymers of polystyrene with other comonomers (such as styrene-acrylonitrile copolymers, acrylonitrile-butadiene-styrene copolymers, styrene-butene-1-acrylonitrile copolymers). Other suitable materials are polycarbonates, polysulfones, polyesters, polymethacrylates, polyvinyl chloride, polyvinylidene chloride, and copolymers of vinyl chloride and vinylidene chloride with other comonomers such as ethylene, vinyl acetate, ethyl methacrylate and others.

When injection molding heat-sensitive materials such as polyvinyl chloride, it is understood that stabilizers, inhibitors, additional fillers, coloring agents, lubricants, impact modifiers, and other additives can be preblended with the thermoplastic material prior to its incorporation with the glass fibers as feed stock for the injection-molding operation.

To prepare the thermoplastic material-glass fiber mixture, from about 20 to about 40 percent weight of thermoplastic material in dry powder form is used based on the total weight of the final mixture. This powdered thermoplastic material should have a particle size such that about 90 percent will pass through a 40 mesh screen and be retained on a 200 mesh screen (U.S. standard screen). While the particle size distribution is not critical, it is preferred to have about 10 to about 20 percent between screen sizes 30–100, about 30–50 percent between screen sizes 100–150, and about 25–45 percent between screen sizes 150–200. It is immaterial whether the thermoplastic material is in the form of irregular shaped granules or regular shaped particles, the important thing being that the material be in a finely divided state having the particle size range set forth above.

The pellets of the thermoplastic material may be large, naturally formed granules or manufactured pellets from a conventional pellet-forming apparatus such as an extruder or a sheet dicer. The pellets should have a maximum dimension of about 1/16 inch to about ⅜ inch. They may be in the form of rods, cubes, squares, spheres, or other suitable shapes. From about 40 to about 60 percent weight of pelleted thermoplastic is used based on the total weight of the final mixture.

The percentage of glass fibers used in the final mixture should be from about 20 to about 40 percent based on the total weight of the final mixture. The glass fibers used in the present invention preferably have a length of from about 1/16 inch to about 2.0 inches. Preferably the glass fibers have a length of from about ¼ inch to about ¾ inch. The dimension of the individual glass fibers used may be that possessed by any of the standard commercially available fibers. Suitable commercial glass fibers include Owens-Corning 885-BB, Owens-Corning P-690F X-1, and Pittsburgh Plate Glass Industries HR-3129. The fibers may be in the form of individual monofilaments or they may be in the form of strands or threads made from a plurality of monofilaments of very small size. The strands may be bonded with suitable bonding agents such as polyvinyl acetate or other suitable material so that they will maintain their integrity after they are chopped into the short lengths. It is preferred that the glass fibers be initially present as multifilament bonded strands that can be broken up and dispersed in the heating and masticating portion of the injection-molding machine.

It is preferred to prepare a premix or blend of the three components using a conventional tumbling shell mixer or other suitable mixer such as a ribbon blender. The preblended homogenized feed material is then fed to the inlet hopper of the injection-molding apparatus by any suitable means such as screw feeder, vibrating conveyor, or other conventional, suitable means. The premixed feed material does not have to be "starve fed" to the injection-molding machine and may be allowed to completely fill the inlet hopper without danger of agglomeration or "bridging" of the glass fibers with a resultant sifting of the powdered component.

However, if desired, the three components of the mixture may be fed separately by any suitable metering means into the feed pocket of an injection-molding machine where they are intermixed by the screw of the molding machine.

Several samples were prepared in accordance with the present invention to illustrate the effect upon feed characteristics and physical properties of various blends of glass and resin. The samples were prepared by blending the components in a conventional mixer, feeding the mixed ingredients to an injection-molding machine by suitable conventional means, and then injection molding the samples. All samples contained 4 parts per 100 parts resin of $TiO_2$. Sample No. 1 contained 80 percent of a powdered resin consisting primarily of polyvinyl chloride which had a particle size distribution such that about 90 percent would pass through a 40 mesh screen and be retained on 200 mesh screen (U.S. standard screen), and about 20 percent glass fibers having a length of about 1/16 inch (Owens-Corning P-690F X-1). No pellets of polyvinyl chloride were incorporated in Sample No. 1. Sample No. 2 was prepared using about 80 percent of pellets having maximum dimensions from about 1/16 inch to about ⅜ inch and consisting primarily of polyvinyl chloride, and about 20 percent of the same glass fibers used in preparing Sample No. 1. No powdered polyvinyl chloride resin was used in Sample No. 2. The third sample was prepared by using about 40 percent of the pellets of Sample 2, 40 percent of the powder of Sample 1, and about 20 percent of the glass fibers used in Sample 1. Sample 4 was prepared by using about 60 percent of the pellets of Sample 2, about 20 percent of the powder of Sample 1, and about 20 percent of the glass fibers of Sample 1. Various tests were run on the samples and the results are summarized in Table I.

TABLE I

| Test procedure | Sample | | | |
|---|---|---|---|---|
| | 1 | 2 | 3 | 4 |
| Specific gravity ASTM D792 | 1.57 | 1.59 | 1.53 | 1.58 |
| Tensile yield D638 | 9,950 | 8,500 | 11,310 | 10,950 |
| Tensile elastic modulus D638 | 1,124,000 | 1,025,000 | 944,000 | 1,079,000 |
| Flexural strength D790 | 14,360 | 15,630 | 17,370 | 17,290 |
| Flexural elastic modulus D790 | 848,000 | 802,000 | 866,000 | 884,000 |
| Izod impact D256 | 0.82 | 0.72 | 1.0 | 0.94 |
| Tensile impact D256 | 12.5 | 10.8 | 18.1 | 16.0 |
| Deflection temp. 264 p.s.i. D648 | 78.5 | 76.0 | 77.0 | 78.0 |
| Izod unnotched D256 | 3.8 | 4.4 | 5.8 | 5.7 |

It can be seen from the table that the samples which contained both powder and pellets (Samples 3 and 4) have significantly increased yield strengths, flexural strengths, elastic moduli, Izod impact strengths, tensile impact strengths, and Izod unnotched impact strengths. The samples (1 and 2) which contained either glass and resin pellets alone, or glass and resin powder alone were significantly lower in these properties.

All of the samples were tested to determine the distribution of glass fibers within the articles. The samples prepared in accordance with Samples 3 and 4 were found to have glass fibers uniformly distributed throughout, with most of the bundles of the glass fibers being separated.

Samples prepared from blends of other powered and pelleted thermoplastic resins with glass fibers were prepared and injection molded to produce articles having uniform distribution of glass fibers in the article. These thermoplastic resins included high density polyethylene, polypropylene, polystyrene, acrylonitrile-butadiene-styrene copolymer, and Nylon 66.

What is claimed is:

1. A process for manufacturing a shaped article by injection molding polyvinyl chloride and glass fibers, the improvement comprising:

a. heating and masticating together a mixture of
  i. from about 20 to about 40 percent weight, based on said mixture, of said polyvinyl chloride material in the form of powder having a particle size from about 30 to about 200 mesh;
  ii. from about 40 percent to about 60 percent weight, based on said mixture, of said polyvinyl chloride in the form of pellets having a maximum dimension of from about 1/16 inch to about ⅜ inch; and
  iii. from about 20 to about 40 percent weight, based on said mixture of glass fibers having a length of from about 1/16 inch to about 2.0 inches until a uniform, flowable plasticized mass is produced; and b. injecting said mass into an injection mold to produce said article.

2. The process of claim 1 wherein said polyvinyl chloride pellets, said polyvinyl chloride powder, and said glass fiber are combined into a uniform mixture prior to said heating and mastication step.

3. The process of claim 1 wherein said heating and masticating step is carried out by means of an injection-molding machine provided with a heated barrel containing a rotating screw.

4. A thermoplastic composition adapted for direct feeding to an injection-molding machine comprising a mixture of
   a. from about 20 to about 40 percent weight, based on said mixture, of polyvinyl chloride in the form of a powder having a particle size from about 30 to about 200 mesh;
   b. from about 40 percent to about 60 percent weight, based on said mixture, of said polyvinyl chloride in the form of pellets having a maximum dimension of from about 1/16 inch to about ⅜ inch; and
   c. from about 20 to about 40 percent weight, based on said mixture, glass fibers having a length of from about 1/16 inch to about 2.0 inches.

5. A shaped article produced from the thermoplastic composition of claim 4.

6. A shaped article produced by the process of claim 1.

* * * * *